United States Patent [19]

Philips

[11] Patent Number: 5,550,812
[45] Date of Patent: Aug. 27, 1996

[54] SYSTEM FOR BROADCASTING AND RECEIVING DIGITAL DATA, RECEIVER AND TRANSMITTER FOR USE IN SUCH SYSTEM

[75] Inventor: Norbert J. L. Philips, Leuven, Belgium

[73] Assignee: U.S. Philips Corporation, New York, N.Y.

[21] Appl. No.: 108,560

[22] PCT Filed: Feb. 27, 1992

[86] PCT No.: PCT/NL92/00039

§ 371 Date: Aug. 23, 1993

§ 102(e) Date: Aug. 23, 1993

[87] PCT Pub. No.: WO92/16063

PCT Pub. Date: Sep. 17, 1992

[30] Foreign Application Priority Data

Feb. 28, 1991 [GB] United Kingdom ............... 9104241

[51] Int. Cl.$^6$ ..................... H04J 11/00; H04L 27/144
[52] U.S. Cl. ..................... 370/19; 370/69.1; 375/362; 455/182.2
[58] Field of Search ................ 370/12, 19, 20, 370/72, 21, 23, 69.1, 74, 76, 122, 123, 110.2, 100.1, 105.1, 105.2; 375/260.362, 326, 344, 281, 283; 455/182.2, 192.2, 197.1, 295

[56] References Cited

U.S. PATENT DOCUMENTS

| | | | |
|---|---|---|---|
| 4,199,809 | 4/1980 | Pasahow et al. | 370/110.2 |
| 4,881,241 | 11/1989 | Pommier et al. | 375/38 |
| 4,881,245 | 11/1989 | Walker et al. | 370/74 |
| 5,048,054 | 9/1991 | Eyuboglu et al. | 375/10 |
| 5,170,413 | 12/1992 | Hess et al. | 375/38 |
| 5,191,576 | 3/1993 | Pommier et al. | 370/69.1 |
| 5,228,025 | 7/1993 | Le Floch et al. | 370/20 |
| 5,274,629 | 12/1993 | Helard et al. | 370/50 |
| 5,307,376 | 4/1994 | Castelain et al. | 370/20 |

OTHER PUBLICATIONS

Le Floch et al., "Digital Sound Broadcasting to Mobile Receivers", IEEE Transactions on Consumer Electronics, vol. 35, No. 3, Aug. 1989, pp. 493–503.

Alard et al., "Principles of modulation and channel coding for digital broadcasting for mobile receivers", EBU Review Technical, No. 224, Aug. 1987, pp. 168–190.

*Primary Examiner*—Wellington Chin
*Assistant Examiner*—Chau T. Nguyen
*Attorney, Agent, or Firm*—Anne E. Barschall

[57] ABSTRACT

System for broadcasting and receiving digital data within time divisional multiplexed channels, grouped in frames, each frame comprising multicarrier symbols, including data symbols and system symbols, each symbol comprising a set of orthogonal frequency division multiplexed carriers at carrier positions within a frequency raster with regular carrier spacing. To provide in such system the possibility for a dynamic and accurate synchronization of the local oscillator of the receiver with that of the transmitter while allowing the free running tolerance range of the receiver's local oscillator to be much wider than that of the known receiver, the frames include frequency reference symbols, each carrying information to generate a peak value at at least one reference peak position within the frequency raster separated by at least one carrier position from each of the edges of the frequency raster and by at least two carrier positions from an eventual subsequent reference peak position.

8 Claims, 5 Drawing Sheets

SYSTEM FOR BROADCASTING AND RECEIVING DIGITAL DATA, RECEIVER AND TRANSMITTER FOR USE IN SUCH SYSTEM

FIELD OF THE INVENTION

The invention refers to a system for broadcasting and receiving digital data within time divisional multiplexed channels, grouped in frames, each frame comprising multicarrier symbols, including data symbols and system symbols, each symbol comprising a set of orthogonal frequency division multiplexed carriers at carrier positions within a frequency raster with regular carrier spacing.

The invention also refers to a receiver and to a transmitter for use in such system.

BACKGROUND OF THE INVENTION

Such system as well as a receiver and a transmitter for use in such system is known e.g. from the article "Digital Sound Broadcasting to Mobile Receivers" by B. Le Floch et at, published in "IEEE Transactions on Consumer Electronics", Volume 35, number 3, August 1989.

In the abovementioned known system each carrier position within the symbols is occupied either by a data carrier or by a virtual carrier, having a window length being at least equal to one period of the lowest data carrier frequency, the virtual carriers having no signal power.

The digital data to be broadcasted are modulated on said data carriers using differential quadrature phase shift key modulation (DQPSK). The carriers are thereafter conversed via an inverse FFT (Fast Fourder Transform) processor into I (In-phase) and Q (Quadrature) time signals, followed by a quadrature modulation of these time signals on a transmission carrier. This system can be used for broadcasting digital audio signals and is therefore indicated as OFDM DAB (Orthogonal Frequency Division Multiplex Digital Audio Broadcasting) system.

In the receiver the reverse signal processing occurs: by using a local tuning oscillator followed by a quadrature demodulator the above baseband I and Q time signals are derived from the received quadrature modulated transmission carrier. After an analog to digital conversion these baseband I and Q time signals are applied to an FFT processor, subsequently followed by a differential demodulator, a circuit for sample deinterleaving and error correction, a sound decoding device and sound reproduction means.

In a typical usage mode an FFT of 512 points is used for modulating 448 data carriers, the remaining 64 carriers being virtual carriers as these virtual carriers have no signal power and therewith no transmission capacity. The data carriers occupy the middle range of the frequency raster, the virtual carriers are located in two mutually equal numbered groups adjacent to the group of said data carriers. The virtual carriers therewith occupy frequency ranges at each of both edges of the frequency raster which fall within the transition bands of the filters, used for selecting the useful signal at the receiver's side.

Each symbol is preceded by a guard interval for dealing with multipath effects. Each frame starts with a number of system symbols, including a zero symbol, which is used for a.o. frame synchronization and for determining channel properties and a phase reference symbol, hereinafter referred to as reference symbol, for initial phase reference.

In order to avoid carrier leakage, the FFT window has to be equal to an integer number of the period of the baseband signals. This means, that the frequency deviation of the local tuning oscillator in the receiver may only deviate from that of the local oscillator in transmitter over a very small distance. A typical value for a single frequency network (SFN) with a symbolperiod Ts=1250 microsec. is 25 Hz relative to 125 MHz or 0.2 p.p.m..

In the above article an AFC (Automatic Frequency Control) system is disclosed, which is based on a detection of the systematic deviation of the DQPSK signal vector from its expected value. In this way it is possible to detect and correct a maximum phase deviation of ±45 degrees. Because of the use of differential modulation, this corresponds to a maximum frequency deviation of ±⅛Ts.

In the above example of a SFN the required stability or free running frequency tolerance range of the local oscillator is then 100 Hz relative to 125 MHz or 0.8 p.p.m.

It is a first object of the invention to provide in a system for broadcasting and receiving digital data the possibility for a dynamic and accurate synchronization of the local oscillator of the receiver with that of the transmitter while allowing the free running tolerance range of the receiver's local oscillator to be much wider than that of the known receiver. Such local oscillators are relatively cheap.

It is a second object of the invention to provide a receiver with an AFC circuit for use in such last mentioned system to realize a coarse AFC tuning of a local receiver oscillator frequency to the local transmitter oscillator frequency, which is especially suited to be used in combination with a fine AFC tuning circuit for substantively extending the tracking range of such fine AFC tuning circuit and which allows the use of a relatively cheap receiver local oscillator.

It is a third object of the invention to provide a receiver with an AFC circuit for use in the last mentioned system to realize a fine AFC tuning of a local receiver oscillator frequency to the local transmitter oscillator frequency, which, with regard to that of the known receiver has a wider tracking range and allows the use of a much cheaper local receiver oscillator.

It is a fourth object of the invention to provide a transmitter which is suitable to be used in cooperation with each of the lastmentioned receivers.

In order to meet said first object a system for broadcasting and receiving digital data within time divisional multiplexed channels, grouped in frames, each frame comprising multicarrier symbols, including data symbols and system symbols, each symbol comprising a set of orthogonal frequency division multiplexed carriers at carrier positions within a frequency raster with regular carrier spacing, according to the invention is characterized in that said frames include frequency reference symbols, each carrying information to generate a peak value at at least one reference peak position within the frequency raster being separated by at least one carrier position from each of the edges of the frequency raster and by at least two carrier positions from an eventual subsequent reference peak position.

As already mentioned above each carrier position within the symbols is occupied either by a data carrier or by a virtual carrier, the virtual carriers having no signal power.

SUMMARY OF THE INVENTION

The beforementioned system according to the invention is preferably characterized in that each of the frequency reference symbols comprises at each reference peak position a data carrier having a peak signal power level, each such data carrier being separated by at least one virtual carrier from each of the edges of the frequency raster and by at least two virtual carriers from the data carrier at an eventual subsequent reference peak position.

In order to meet said second object of the invention a receiver for use in the above system according to the invention, is characterized by means for detecting the frequency position of each peak value within the frequency raster of a received frequency reference symbol, means for deriving a first AFC signal from the frequency difference between the lastmentioned position on the one hand and the initial reference peak position on the other hand, said first AFC signal being supplied to frequency control means for reducing said frequency difference.

In order to meet the third object of the invention a receiver for use in a system according to the invention is characterized by means for determining the ratio of leakage components occurring at both adjacent carrier positions of a peak position, means for deriving a second AFC signal from said ratio, which varies with said ratio, said second AFC signal being supplied to frequency control means for reducing the difference between said ratio and unity.

Preferably the lastmentioned receiver according to the invention is characterized in that said second AFC signal varies with the power ratio of the carrier leakage components occurring at both adjacent carrier positions of a peak position.

A further preferred embodiment of the lastmentioned receiver is characterized in by a window signal processing of the received frequency reference symbol for emphasizing the power of the carrier leakage components increasingly in the direction of the reference peak position.

In order to meet the fourth object of the invention a transmitter for use in a system according to claim 1 according to the invention is characterized by a signal generator for generating said frequency reference symbol.

Preferably such transmitter is characterized in that said signal generator comprises means for generating within each frequency reference symbol at each reference peak position a data carrier having a peak signal power level, each such data carrier being separated by at least one virtual carrier from each of the edges of the frequency raster and by at least two virtual carriers from the data carrier at an eventual subsequent reference peak position.

BRIEF DESCRIPTION OF THE DRAWING

In the following a description of an example of the invention is given with reference to the drawing.

DETAILED DESCRIPTION OF THE INVENTION

Figure 1A:
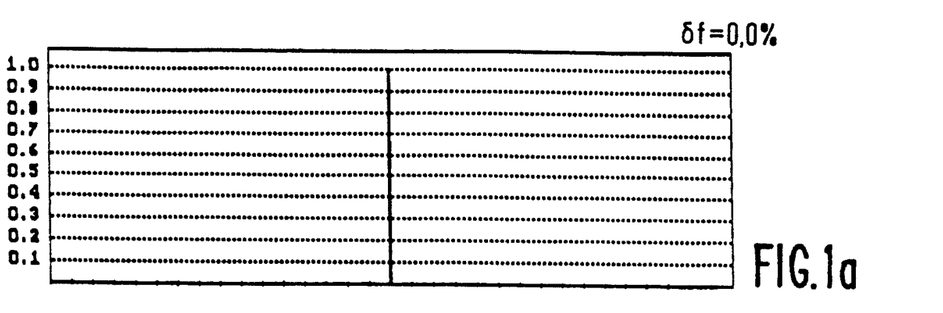
FIG. 1 shows the spectral power of a received AFC symbol according to the invention having a single data carrier on a linear scale without frequency deviation respectively with a frequency deviation of 30%.

FIG. 1a shows on linear scale the spectral power of a frequency reference symbol according to the invention, hereinafter also referred to as AFC symbol having a single dam carrier calculated with an FFT (Fast Fourrier Transform) using a rectangular window. In this example, the AFC symbol shown includes one peak value occurring at the frequency of said single data carrier, hereinafter also indicated as initial reference peak position or reference peak position. If such AFC symbol is transmitted and received without any frequency deviation, then the power spectrum of the received AFC symbol calculated with an FFT (Fast Fourder Transform) using a rectangular window is identical to the one shown in this FIG. 1a.

Figure 1B:
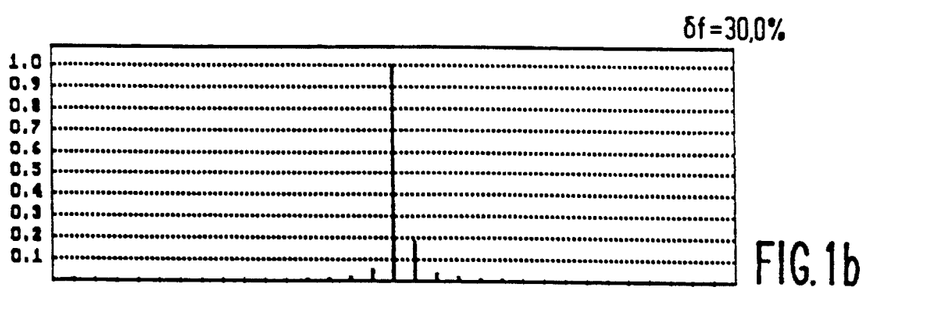

If however a frequency deviation of 30,0% occurs during transmission, then the power spectrum on linear scale of the received AFC symbol calculated with an FFT (Fast Fourder Transform) using a rectangular window is as shown in FIG. 1b. Due to the frequency deviation, signal power dispersion occurs resulting in asymmetrical leakage components at carrier frequencies adjacent to the reference peak position. From the ratio of the levels of these leakage components the direction of the frequency deviation can be derived, whereas the amplitude of the frequency deviation can be derived from this ratio and the amplitudes of these levels with regard to the peak value at the reference peak position.

Figure 2A:
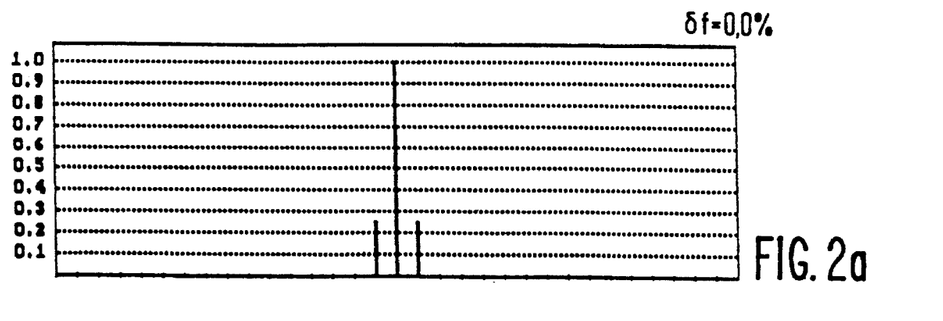
FIG. 2 shows similar diagrams after using a Hanning window.

FIG. 2a shows on linear scale the spectral power of an AFC symbol having a peak value at a single data carrier, received without any frequency deviation, calculated with an FFT using a Hanning window.

Figure 2B:
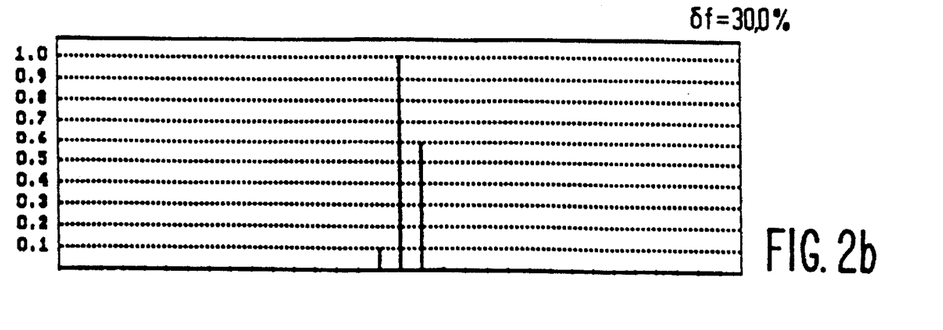

FIG. 2b shows on linear scale the spectral power of an AFC symbol having a peak value at a single data carrier, received with a frequency deviation of 30,0% calculated with an FFT using a Hanning window.

These FIGS. 2a and 2b illustrate the selective amplification of the leakage components, which can be achieved by using an FFT algorithm with a Hanning window in the calculation of these leakage components.

Figure 6:
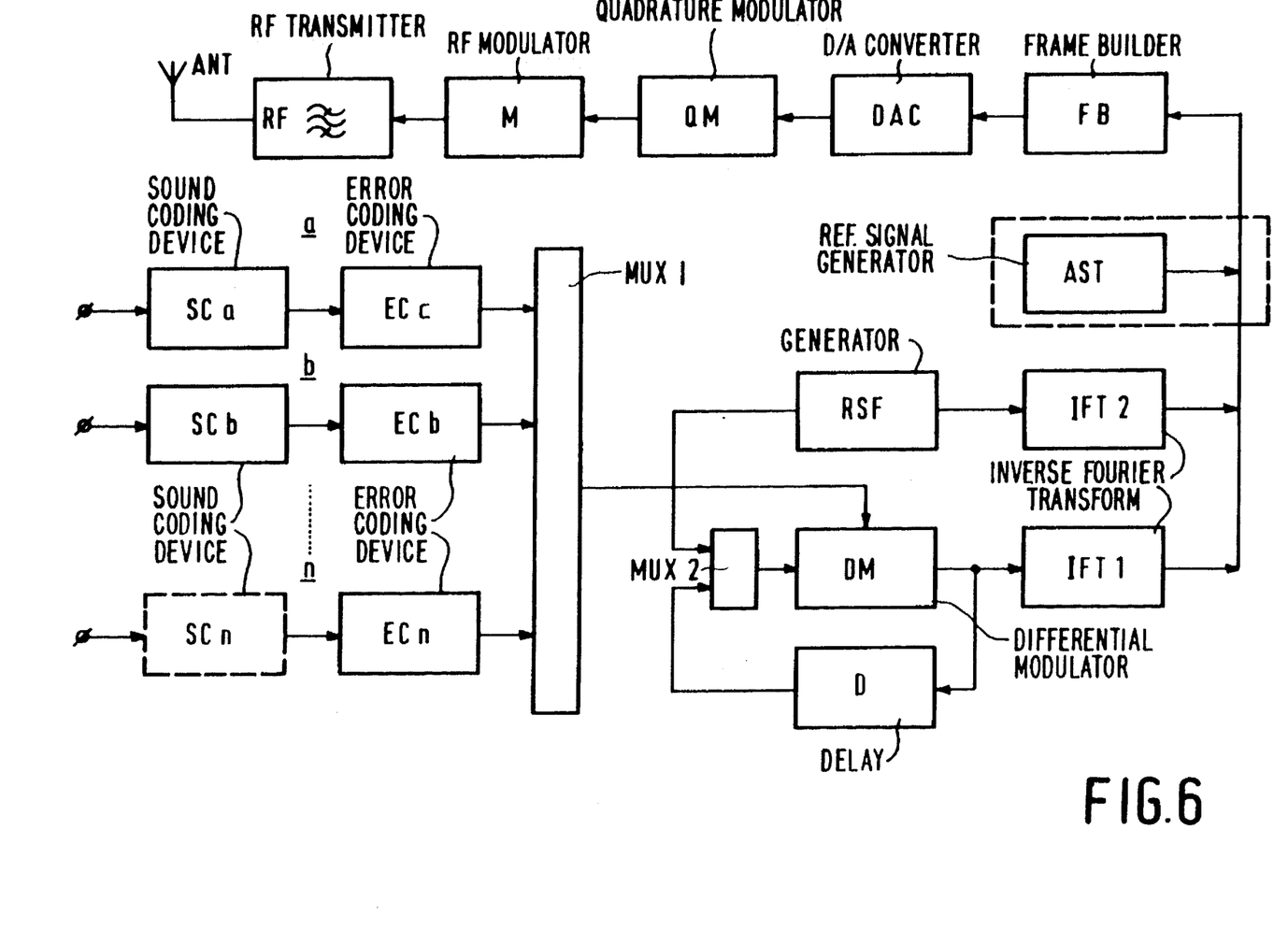
FIG. 6 shows a block diagram of a DAB transmitter according to the invention.

FIG. 6 shows a block diagram of a DAB transmitter according to the invention, comprising parallel DAB channels a, b ... n, respectively including sound coding devices SCa ... SCn and connected thereto error coding devices ECa ... ECn. Outputs of the error coding devices ECa ... ECn are connected to a first multiplexer MUX1 for converting the parallel output bit sequencies of the DAB channels a-n into one serial sequence of digital data bits. The first multiplexer MUX1 supplies the series of digital data bits to a differential modulator DM. An output of DM is being connected via a one symbol delay device D to an input of a second multiplexer MUX2, this second multiplexer MUX2 being connected to an input of DM. DM, D and MUX2 function as a differential quadrature phaseshift key (DQPSK) modulator in the frequency domain. An initial or reference phase is supplied to MUX2 from a generator RSF for generating reference symbols in the frequency domain, whereby one reference symbol per each frame is generated. In the sequence of data symbols within a frame, the reference symbol is used as a phase reference in the differential modulation of the first data symbol following the reference symbol, whereas in the differential modulation of the second data symbol, the first data symbol is used as phase reference, and so on.

An output of the DQPSK modulator is connected to a first inverse digital Fourrier transform device IFT1. IFT1 realises a digital inverse Fourrier transform of the output signals of the DQPSK modulator, therewith converting these output signals from the frequency domain into the time domain. To the time domain signals of IFT1 are added the reference symbols of the generator RSF after being converted from the frequency domain to the time domain in a second inverse Fourrier transform device IFT2. The so obtained time domain reference and data symbols are thereafter grouped into frames in a frame building device FB, in which frame building device FB a zero symbol is inserted in each frame, preceding any other symbol within the frame (see FIG. 5A and 5B). The frame building device FB is connected to an input of a digital to analog converter and filter device DAC. An output of DAC is connected to a quadrature modulation stage QM for modulating in quadrature the output signals of the digital to analog converter and filter device DAC. QM is connected to an RF modulator M for modulating the DAB signal on a main RF transmission carrier. After being selectively filtered the RF modulated DAB signal is transmitted through an RF antenna device ANT.

The DAB transmitter described sofar is on itself known e.g. from the article "Principles of Modulation and Channel Coding for Digital Broadcasting for Mobile Receivers" published in "EBU Review Technical" No. 224, August 87 by M. Allard e.a. For a proper understanding of the invention it is not necessary to go further into the details of the functions of the separate block of the DAB transmitter as shown. Reference is made to the lastmentioned article for a precize and detailed explanation of this known DAB transmitter.

A DAB transmitter according to the invention comprises in addition to the beforementioned known one, a generator AST for generating frequency reference symbols, hereinafter also referred to as AFC symbols. In the embodiment shown in FIG. 6 one AFC symbol is inserted into each frame in the time domain subsequent to the zero symbol. The AFC symbols include information to generate at least one peak value occuring at a reference peak position being separated by at least one carrier position from each of the edges of the frequency raster and by at least two carrier positions from an eventual subsequent reference peak position. In practise AFC symbols may comprise more than one peak value. FIG. 1a showing the spectrum of an AFC symbol with one peak value within its frequency raster, is merely given by way of example.

Figure 5A:
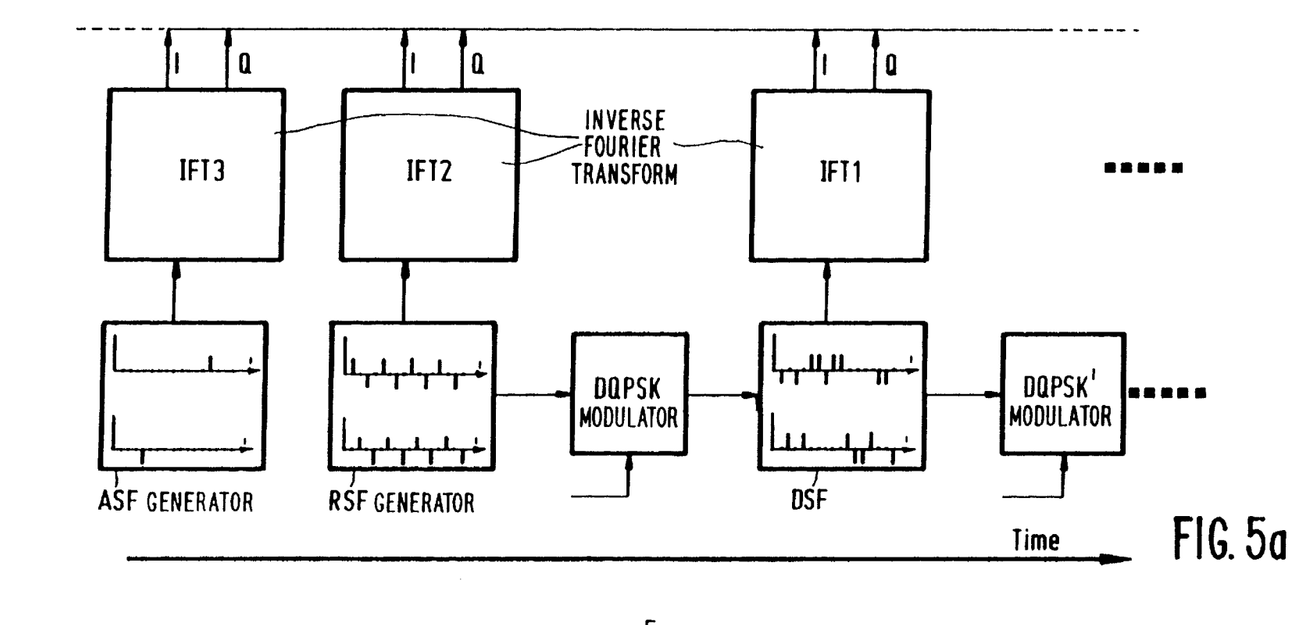
FIG. 5 shows the generation of an AFC symbol according to the invention in a DAB transmitter.
Figure 5B:
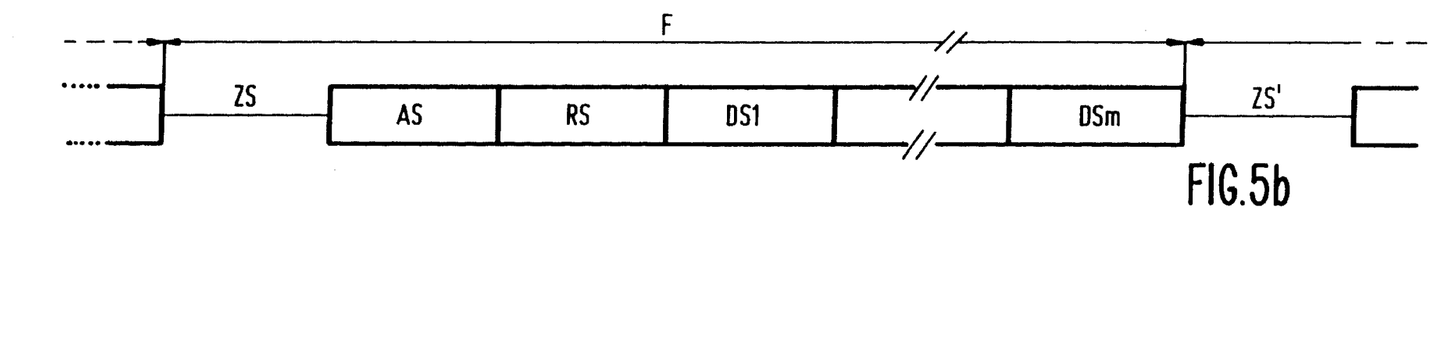

In FIG. 5a is shown in functional bloch on a time scale, how the ultimate baseband DAB signal is build up from the various symbols. A generation of AFC symbols in the frequency domain occurs in a generator ASF, the complex frequency spectrum of an example of such AFC symbol being shown in block ASF. ASF together with an inverse Fourrier transform in a third inverse Fourrier transform device IFT3, supplies AFC symbols in the time domain and as such functions as the beforementioned generator AST. In FIG. 5a is also shown the function of the beforementioned generator RSF for generating reference symbols in the frequency domain. The complex frequency spectrum of a reference symbol may be as e.g. shown in block RSF. The generator RSF is coupled to the second inverse Fourrier transform device IFT2. The above reference symbols in the frequency domain are supplied to the DQPSK modulator together with the digital data bit stream coming from MUX1. As already mentioned in the beforegoing these digital data are differential quadrature phase shift key modulated in the DQPSK modulator with the help of the reference symbol coming from RSF. The first data symbol within the frame following the reference symbol is differentially modulated with a phase reference indicated by the reference symbol, resulting in a signal having a complex frequency spectrum as given in block DSF of FIG. 5A. This first data symbol is used as a phase reference in the differential modulation of the second data symbol indicated with block DQPSK', and so on. The so obtained DQPSK modulated digital data are inverse Fourrier transformed in IFT1 and therewith converted into the time domain. The time domain I and Q output signals of IFT1, IFT2 and IFT3, i.e. the time domain data symbols DS1... DSm, the time domain reference symbols RS and the time domain AFC symbols AS are thereafter grouped into frames in the frame building device FB. As already mentioned above in FB a socalled zero symbol is added to each frame, this zero symbol preceding any other symbol within the frame. This results in a time domain DAB signal as shown in FIG. 5B, each frame starting with a zero symbol ZS, subsequently followed by an AFC symbol AS and data symbols DS1... DSm.

Figure 4:
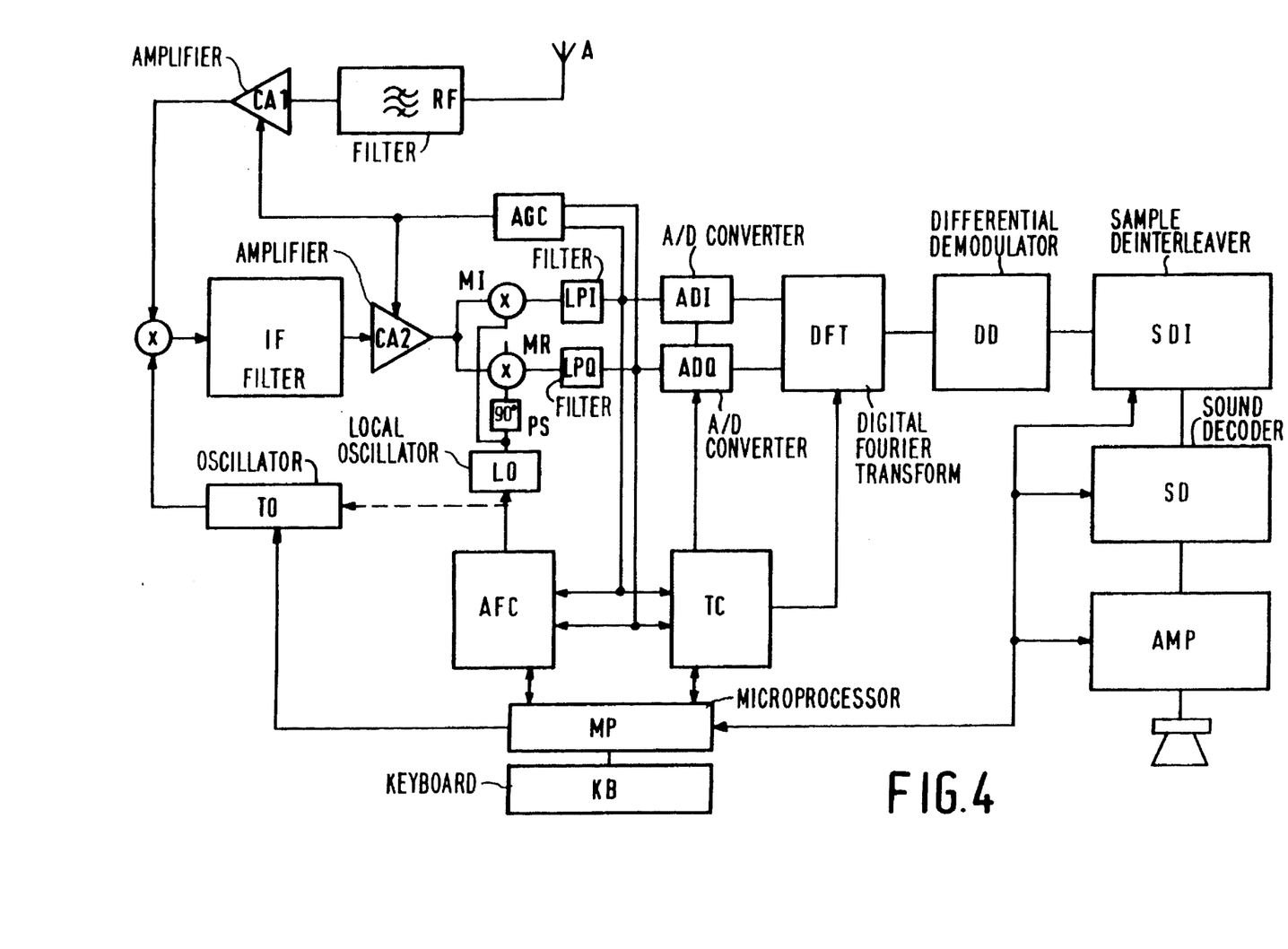
FIG. 4 shows a block diagram of a DAB receiver according to the invention.

FIG. 4 shows a block diagram of a DAB receiver according to the invention comprising an RF filter RF connected at its input to an RF antenna A and at its output to a first controlled amplifier CA1. An output of CA1 is connected to a mixer M for converting a wanted RF DAB receiving signal into an intermediate frequency (IF) DAB signal. This is achieved by supplying a tuning oscillator frequency from a local tuning oscillator TO to the mixer M. TO may be included in a frequency synthesizer (not shown). An output of the mixer M is connected through an IF filter IF to a second controlled amplifier CA2. Control inputs of CA1 and CA2 are supplied with an automatic gain control (AGC) signal from an AGC signal generator AGC. An output of the second controlled amplifier CA2 is connected to a quadrature demodulator for demodulating the IF DAB signal into quadrature baseband DAB signals, comprising in in-phase (I) and quadrature (Q) signal paths in-phase and quadrature mixers MI respectively MQ, which are supplied with quadrature local oscillator frequencies from a local oscillator LO. Outputs of MI and MQ are connected to respectively in-phase and quadrature baseband filters LPI and LPQ, which are connected to in-phase and quadrature analog to digital converters ADI and ADQ. Outputs of ADI and ADQ are connected to a digital Fourrier transform device DFT. DFT converts the quadrature signals from the time domain into the frequency domain. An output of DFT is connected to a differential demodulator DD, which in turn is connected to an input of a sample de-interleaving and error correction device SDI. An output of SDI is connected to a sound decoding device SD, which delivers its signals to a sound amplifier AMP. The sound amplifier AMP is connected to means L for sound reproduction.

Outputs of the in-phase and quadrature baseband filters LPI and LPQ are connected to an to a time base circuit TC as well as to inputs of the beforementioned AGC signal generator AGC. Control of e.g. the time base circuit and the tuning of the local tuning oscillator TO takes place from a microprocessor MP, which in turn can be manually controlled from a key board. The part of the DAB receiver described so far is on itself known from e.g. FIG. 12 of the article "Digital Sound Broadcasting to Mobile Receivers" published in "IEEE Transactions on Consumer Electronics", Vol. 35, No. 3, August '89, by Bernard Le Floch. A precise and detailed description of the functions of the separate blocks shown in FIG. 4 is not necessary to understand the invention and can be derived from the lastmentioned article.

The DAB receiver according to the invention shown in this FIG. 4 comprises in addition to the above known DAB receiver an AFC (automatic frequency control) device AFC. As will be clearified hereinafter the AFC device AFC derives a first or coarse AFC signal and a second or free AFC signal from the received AFC symbols. An input of the AFC device AFC is therefore connected to the quadrature signal paths, e.g. at the outputs of the in-phase and quadrature baseband filters LPI and LPQ. Outputs of the AFC device AFC are connected to the local tuning oscillator TO and the local oscillator LO for respectively supplying thereto said first or coarse AFC signal and said second or fine AFC signal for an automatic frequency control or frequency synchronization of the received DAB signal with the transmitted DAB signal. In the embodiment shown in this FIG. 4, the oscillator TO and/or LO function as frequency control means to achieve said frequency synchronization. It will be clear, that both AFC output signals of the AFC device AFC may very well be used to control either TO or LO or to control other known alternative means for frequency control and that dependent on the manner how the AFC symbols are separated from the rest of the DAB signals, the AFC device AFC may have its input connected at other points of the signal path of the DAB receiver.

The derivation of said first or coarse and said second or fine AFC signals in the automatic frequency control device AFC of the DAB receiver according to the invention will be explained in the following:

An orthogonal frequency division multiplex (OFDM) digital audio broadcast (DAB) receiver has to work properly under varying receiving conditions like speed, temperature and humidity, and this at a reasonable cost. Since DAB demodulation is very sensitive with respect to frequency deviations, some kind of Automatic Frequency Control (AFC) is needed.

Since differential encoding is used, phase locking is not necessary because in this case the previous symbol is used as a phase reference. The only requirement is that the frequency deviation is sufficiently small, so that the phase shift between two succeeding symbols is neglectable with respect to π/4. We assume that the frequency drift of the Local Oscillator (LO) over one frame will be low enough so that a feedback at the frame repetition rate will be sufficient to keep the LO locked to the received signal.

A frequency deviation δf of the LO with respect to the suppressed carrier, will result in a shift δf in the received spectrum. Fast frequency transform (FFT) techniques can be used to determine this deviation. A coarse detection according a first aspect of the invention can be obtained by comparing the position of the received spectral lines with the initial reference peak positions, hereinafter also referred to as expected positions. In this case an accuracy of ±fs/2 can be obtained, where fs is the frequency spacing of the data carriers.

However, a lot of 'leakage' components (unwanted harmonics) will be generated if the FFT window does not fit with an integer number of periods of the received signal. Therefore, fine tuning is needed.

A method for implementing a dynamic fine tuning AFC according to a second aspect of the invention will be given. By transmitting peak values at widely spaced reference peak positions e.g. data carriers with a large number of virtual carriers in between, the power of the leakage components in the vicinity of each data carrier can be calculated and an algorithm can be set up for reducing this leakage power to a minimum. Since at least two virtual carriers between the subseqeuent data carriers are necessary and furthermore at least one virtual carrier should be located adjacent to each of both edges of the frequency raster, an extra AFC symbol, preferably per frame, is needed. It is shown that a cubic regulation law is obtained with a normal rectangular FFT window.

A preferred algorithm for the lastmentioned dynamic fine tuning AFC is also presented. When a Hanning window is used, the leakage energy is more concentrated around the data carriers and a nearly linear regulation law for the AFC is obtained. Multiple frequency components can be processed, so that the system is resistant to frequency selective fading. The data carriers of the AFC symbol may additionally be used to carry other useful information, which e.g. is phase modulated on these carriers.

A possible AFC implementation strategy is presented, as well as a transmitter and a receiver concept according to the invention.

Coarse AFC Algorithm

In the DAB system, known from the firstmentioned article, the baseband time signals I and Q are generated with a complex FFT algorithm starting from a given complex frequency spectrum. If, for simplicity, we assume a single frequency component at frequency Ω1 with a unity amplitude in real and imaginary channel, the baseband signal Vb(t) can be written as:

$$Vb(t)=\cos \Omega 1t \pm j \sin \Omega 1t = e^{\pm j\Omega 1 t} \quad (1.1)$$

In the transmitter, this signal is modulated in quadrature with a carrier frequency Ωh, resulting in a transmitted signal Vt(t):

$$Vt(t)=\cos\Omega ht \cos\Omega 1t \pm \sin\Omega ht \sin\Omega 1t=\cos(\Omega h \pm \Omega 1)t \quad (1.2)$$

Normally, the receiver will have a frequency deviation δΩ with respect to Ωh. After quadrature demodulation with a proper scale factor and low-pass filtering, the resulting baseband signals can be written as:

$$Ir(t)=2 \cos (\Omega h+\delta\Omega)t \cos (\Omega h \pm \Omega 1)t=\cos (\delta\Omega \pm \Omega 1)t \quad (1.3)$$

$$Qr(t)=2 \sin (\Omega h+\delta\Omega)t \cos (\Omega h \pm \Omega 1)t=\sin (\delta\Omega \pm \Omega 1)t \quad (1.4)$$

Or, in complex notation:

$$Vr(t)=Ir(t)+j \, Qr(t)=e^{j(\delta\Omega \pm \Omega 1)t} \quad (1.5)$$

If we compare (1.5) with (1.1), we notice that:
a. as expected, with δΩ=0, we get correct demodulation.
b. if δΩ<>0, the complete spectrum (positive and negative frequencies) are shifted in the same direction.
c. the direction of shifting is determined by the sign of the frequency deviation.
d. investigation of the position of the spectral lines provides sufficient information for the implementation of an AFC algorithm.

In the DAB system, symbols of length NT are used, where T is the sample period, and N the number of samples in one symbol. The Discrete Fourier Transform (DFT) of such a symbol is given by:

$$Vr\left(\frac{n}{NT}\right) = \frac{1}{N} \sum_{k=0}^{N-1} Vr(kT) \, e^{-j2\pi nk/N} \quad (1.6)$$

Using (1.5) with $\Omega=2\pi f$ and $fs=1/NT$ we get:

$$Vr(nfs) = \frac{1}{N} \sum_{k=0}^{N-1} e^{j2\pi(N\delta fT \pm Nf1T - n)k/N} \quad (1.7)$$

If $\delta f=0$, we find a single carrier at $n=\pm Nf1T$. With $\delta f \neq 0$, the truncation interval of the DFT is not equal to an integer number of periods, and the energy is spread out over all carriers. This effect is known as leakage. Only when $N\delta fT$ is an integer, all energy is concentrated in the frequency line $n=N\delta fT\pm Nf1T$.

Therefore, a coarse detection in the receiver can be implemented by searching for the carrier with the maximum or peak energy (assuming that only one carrier is transmitted) occurring within a received symbol and comparing its frequency location with the expected carrier location.

By applying an appropriate feedback signal to the local oscillator, we can get the carrier with the maximum energy at the correct (expected) location in the frequency raster.

With this technique, also indicated as coarse AFC, an accuracy of $\pm fs/2$ can be obtained. Of course, this is far from the target. For $fs=15625$ Hz we get a resolution of $\pm 8$ kHz, while our target is $\pm 100$ Hz ($\pm 3°$ phase error for a symbol duration of 80 μs) or lower. We only want to indicate that it is possible to correct a frequency deviation exceeding fs. The maximum range is determined by the number of virtual carriers (signal power=0) between the data carriers in the symbol in question. Preferrably a new reference symbol, also indicated as AFC symbol, should be introduced therefore. It is therewith possible to realize a tracking range of this coarse AFC, which is much wider than that of the beforementioned known AFC circuit.

In order to increase the accuracy, we can try to maximize the energy of the received carrier. This, however, is not recommended since the received signal is noisy and fluctuating.

In the following an accurate dynamic free tuning AFC algorithm is presented, which can be used on itself, or in combination with the above coarse AFC and which also makes use of the abovementioned new AFC symbol.

An accurate dynamic fine tuning AFC algorithm;

For an accurate AFC according to the invention use the power of the carriers $\pm Nf1T-1$ and $\pm Nf1T+1$, which are located on the left side and on the right side of a received data carrier are to be investigated. In FIG. 1 the spectral lines are shown for a carrier without frequency error (FIG. 1a) and for a carrier with a frequency error of +30% (FIG. 1b). As can be seen in FIG. 1b, there is a difference $\delta P$ between the power of the two side carriers.

The relation between $\delta P$ and $\delta f$ can be calculated using (1.7). With $n=m\pm Nf1T$, expression (1.7) can be written as:

$$Vr[(m \pm Nf1T)fs] = \frac{1}{N} \sum_{k=0}^{N-1} e^{j2\pi(N\delta fT - m)k/N} \quad (2.1)$$

For small values of $\delta f$ and high values of N, the summation can be approximated by an integral, which leads to:

$$Vr[(m \pm Nf1T)fs] \approx \frac{1}{Ts} \int_0^{Ts} e^{j2\pi(\delta f - mfs)t} dt \quad (2.2)$$

Due to the movement of the receiver and/or the variation of the transmission channel, the signal amplitude may vary continuously. In order to make the error estimation independent of the signal amplitude, it is recommended to calculate $\delta P/P$, where P is the power of the received main carrier, and $\delta P$ the power difference between the upper and the lower leakage carrier. Therefore, expression (2.2) has to be evaluated for $m=0$ and $m=\pm 1$.

The general solution of integral (2.2) is given by:

$$Vr[(m \pm Nf1T)fs] = K \frac{\delta f}{\delta f - mfs} \quad (2.3)$$

With $$K = \frac{\sin(2\pi\delta fTs) + j(1 - \cos(2\pi\delta fTs))}{2\pi\delta fTs} \quad (2.4)$$

The relative power of both side carriers can then be written as:

$$\frac{P+}{P0} = \frac{(\delta f)2}{(\delta f - fs)2} \quad \frac{P-}{P0} = \frac{(\delta f)2}{(\delta f + fs)2} \quad (2.5)$$

while the difference $\delta P/P0$ is given by:

$$\frac{\delta P}{P0} = \frac{P+ - P-}{P0} = \frac{4(\delta f/fs)3}{(1 - \delta f/fs)2(1 + \delta f/fs)2} \quad (2.6)$$

With computer simulations, the value of $\delta P/P0$ is calculated for different values of $\delta f/fs$. In table 2.1, these results are compared with the estimated values, obtained from (2.6). As can be seen, there is an excellent agreement for all frequency deviations up to 50%.

TABLE 2.1

| | Difference between simulated values for $\delta P/P0$ and the values calculated with (2.6). | | | | | | |
|---|---|---|---|---|---|---|---|
| $\delta f/fs$ | ±0.001 | ±0.01 | ±0.1 | ±0.2 | ±0.3 | ±0.4 | ±0.5 |
| simulated | ±4.0E-9 | ±4.0E-6 | ±4.1E-3 | ±3.5E-2 | ±1.3E-3 | ±3.6E-1 | ±8.9E-1 |
| expr. (2.6) | ±4.0E-9 | ±4.0E-6 | ±4.1E-3 | ±3.5E-2 | ±1.3E-3 | ±3.6E-1 | ±8.9E-1 |

From (2.6) and Table 2.1 we can draw the following important conclusions:

1. With this system, a control algorithm for a more accurate AFC can be implemented.
2. The sign of $\delta P/P0$ is the same as the sign of $\delta f$. This is very important in order to determine whether the carrier frequency is lower or higher than the expected value.
3. The difference in power is proportional to the third power of $\delta f$. Therefore it is difficult to obtain a finear regulation law for the AFC. In addition, the error signal becomes very small for small values of $\delta f$.
4. The value of $\delta P/P0$ is not a function of f1. Therefore, several carriers can be used and a mean value for $\delta P/P0$ can be calculated. This makes the algorithm resistant to frequency selective fading.

5. The distance between the different carriers must be large enough, so that the power of the 'far-away' leakage components of other carriers can be neglected with respect to P+ and P−.

A preferred accurate dynamic fine tuning AFC algorithm:

Although the above described algorithm can be used for accurate AFC, it has the disadvantage of a cubic relationship between $\delta P$ and $\delta f$. In addition, the large amount of high power leakage components, as shown in FIG. 2.1, will disturb this relationship when multiple carriers are used.

The energy distribution over the different leakage components can be changed by an appropriate windowing of the time signal. FIG. 2 shows the spectral lines for the same symbol as used for FIG. 1, but after the application of a Hanning window. As can be seen, when $\delta f=0$ two side carriers of equal power appear. For $\delta f<>0$ there is also a difference $\delta P$ between both carriers, as with the previous method, but the energy of the 'far-away' leakage components is much reduced with repect to FIG. 1. Computer simulations also showed a nearly linear relationship between $\delta P/P0$ and $\delta f/fs$.

A theoretical value for $\delta P/P0$ can be calculated with the abovementioned formulas.

In order to apply a Hanning window, we multiply the time function Vr(t) with the following 'weighting' function Vh(t):

$$Vh(t) = 1 - \cos(\Omega st) = 1 - \frac{e^{j\Omega st} + e^{-j\Omega st}}{2} \quad (3.1)$$

The multiplication of (3.1) with (1.5) leads to:

$$Vrh(t)=ej(\delta\Omega\pm\Omega 1)t-\tfrac{1}{2}ej(\delta\Omega\pm\Omega 1+\Omega s)t-\tfrac{1}{2}ej(\delta\Omega\pm\Omega 1-\Omega s)t \quad (3.2)$$

This result indicates that for $\delta f=0$, two side carriers are generated with half the amplitude of the main carrier. This can be expected, since applying a Hanning window is equivalent with an amplitude modulation of the time signal with a frequency fs.

Expression (3.2) is a sommation of components as given in (1.5), but with different exponents. Therefore, the above formulas can be used in order to find the relation between $\delta Ph/P0$ (with Hanning window) and $\delta f/fs$.

The amplitude of the carriers can be written in the same form as expression (2.3), leading to:

$$Vrh[(m \pm Nf1T)fs] = \frac{K*\delta f}{\delta f - mfs} - 1/2 \frac{K*\delta f}{\delta f+fs-mfs} - 1/2 \frac{K*\delta f}{\delta f-fs-mfs} \quad (3.3)$$

The relative power of both side carriers can be written as:

$$\frac{P+}{P0} = \frac{(Vrh[(1 \pm Nf1T)fs])2}{(Vrh[(\pm Nf1T)fs])2} \quad (3.4)$$

$$\frac{P-}{P0} = \frac{(Vrh[(-1 \pm Nf1T)fs])2}{(Vrh[(\pm Nf1T)fs])2}$$

The difference $\delta Ph/P0=(P+-P-)/P0$ is then given by:

$$\frac{\delta Ph}{P0} = 1.5 * \frac{\delta f}{fs} * \frac{(1 + 0.5\ (\delta f/fs)2)\ (1 - (\delta f/fs)2)}{((1 + 0.5\ (\delta f/fs)2)2 - 2.25\ (\delta f/fs)2)2} \quad (3.5)$$

For small frequency deviations, the second order terms can be neglected, giving the very simple result:

$$\frac{\delta Ph}{P0} = 1.5 \frac{\delta f}{fs} \text{ for } \delta f \ll fs \quad (3.6)$$

In Table 3.1 the theoretical values of $\delta Ph$, calculated with (3.5) and (3.6) are compared with computer calculations. As can be seen, there is an excellent agreement for expression (3.5). Expression (3.6) is very useful for small frequency errors. For high frequency deviations the accurary is lower, with a maximum error of 30% on $\delta f/fs$ when it is close to 0.5. Therefore, expression (3.6) can be used for making an estimation of the frequency error $\delta f$ using the relative power difference $\delta Ph/P0$ of the leakage carriers.

TABLE 2.1

Difference between simulated values for $\delta Pn/P0$ with Hanning window and the theoretical values calculated with expressions (3.5) and (3.6).

| $\delta f/fs$ | ±0.001 | ±0.01 | ±0.1 | ±0.2 | ±0.3 | ±0.4 | ±0.5 |
|---|---|---|---|---|---|---|---|
| simulated | ±1.5E-3 | ±1.5E-2 | ±1.5E-1 | ±3.1E-1 | ±4.9E-1 | ±7.0E-1 | ±9.6E-1 |
| expr.(3.5) | ±1.5E-3 | ±1.5E-2 | ±1.5E-1 | ±3.1E-1 | ±4.9E-1 | ±7.0E-1 | ±9.6E-1 |
| expr.(3.6) | ±1.5E-3 | ±1.5E-2 | ±1.5E-1 | ±3.0E-1 | ±4.5E-1 | ±6.0E-1 | ±7.5E-1 |

When multiple carriers are used, an average value ($\delta Ph/P$)av can be calculated, which takes into account the relative power Pi of each carrier i. With linear weighting we get:

$$(\delta Ph/P)av = \frac{\Sigma\ \delta Phi}{\Sigma\ Pi} \quad (3.7)$$

An estimation of the frequency error is then given by:

$$\delta f \approx 0.6667\ fs * (\delta Ph/P)av \quad (3.8)$$

By applying a Hanning window, the drawbacks of the firstmentioned fine tuning AFC method are avoided, while its advantages are preserved. The additional effort required is a multiplication of 2N points (real and imaginary time signal) with the Hanning window (3.1). After FFT and calculation of the power of the carriers near the transmitted carriers, an error signal can be obtained which is nearly proportional to the frequency deviation of the local oscillator, independent of the signal amplitude, and resistant against frequency selective fading. In this way, an accurate Automatic Frequency Control can be implemented.

As already mentioned above an extra AFC symbol has to be introduced in order to implement this AFC algorithm. Since the algorithm has to be resistant against frequency selective fading, this seems to be unavoidable. However, since the proposed AFC algorithm deals only with powers, the data carriers in the AFC symbol can carry useful phase information.

Figure 3:
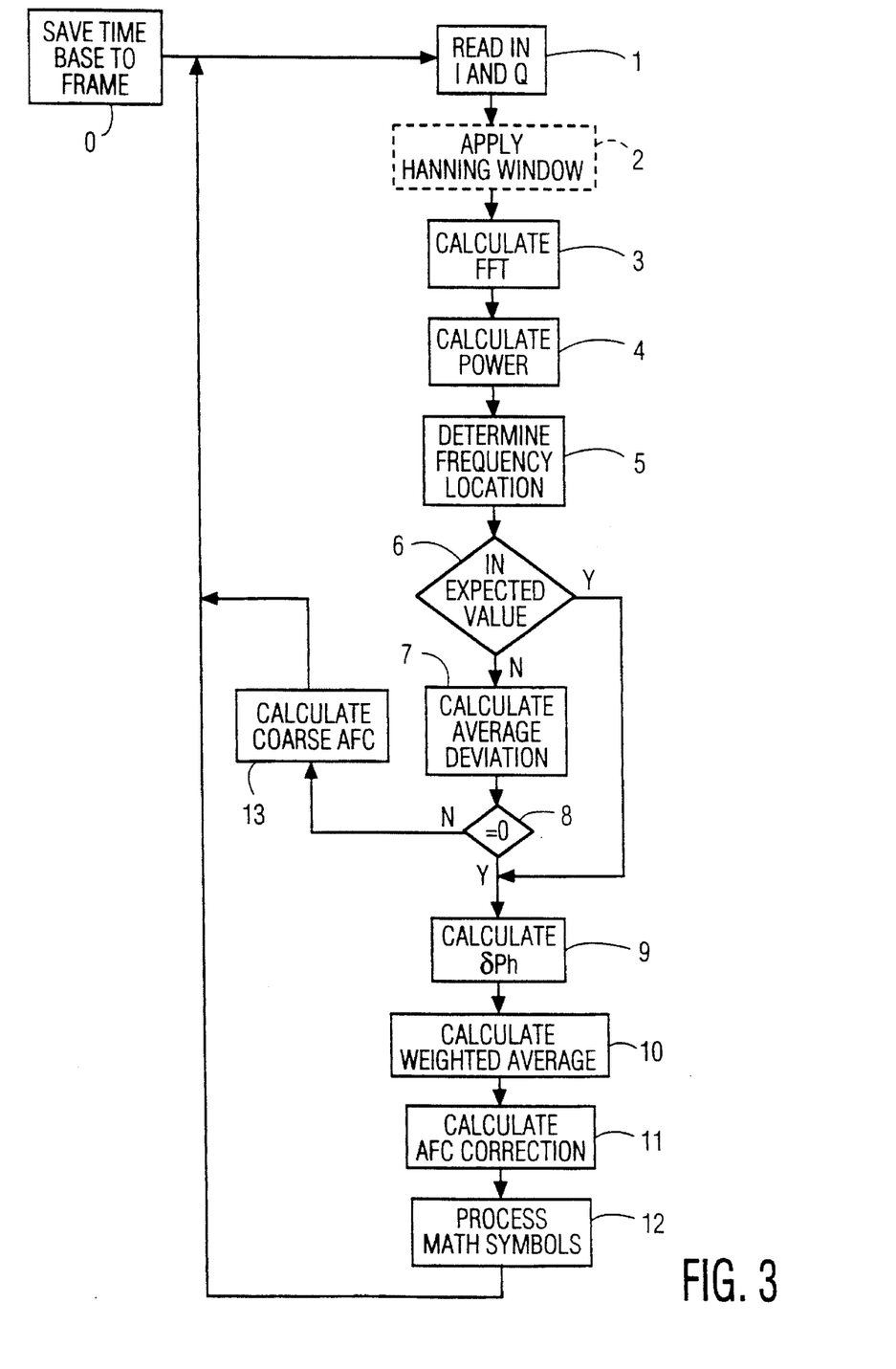
FIG. 3 shows a flow diagram illustrating a first or coarse AFC combined with a second or fine tuning AFC signal derivation algorithm according to the invention.

A possible implementation strategy:

A possible strategy for implementing an Automatic Frequency Control in the receiver is vizualized with the flow diagram of FIG. 3. The method steps therein indicated by their reference numbers are as follows:

0. Synchronize time base with frame.
1. Read in I & Q channel of the AFC symbol.
2. Apply the Hanning window (3.1) on both Ir(t) and Qr(t).

3. Calculate the complex FFT transform of Irh(t)+j Qrh(t).
4. Calculate the power of each frequency component.
5. Determine the frequency location of the carriers with maximum energy above a certain treshold.
6. If the location fits with the expected value, goto 9. If not, goto 7.
7. Calculate average±deviation.
8. Is this average deviation zero? If so, goto 9 (end of AFC coarse tuning). If not, goto 13.
9. Calculate δPh for each carrier i.
10. Calculate a weighted average (δPh/P)av using (3.7).
11. Calculate a second or fine tuning AFC correction signal as a function of the estimated frequency error δf, given by (3.8), and apply it.
12. Process other symbols (reference, data, zero) and goto 1 (get a new AFC symbol or start processing data when δf<δfmax.)
13. Calculate a first or coarse AFC correction signal as a function of the frequency shift (number of carrier shifts) and apply it. Goto 1.

The above described new OFDM DAB system is merely given as an illustration of the basic idea to introduce in the OFDM DAB signal format a new AFC symbol with a predetermined location of peak values or data carriers, such that, the sequential peak values or data carriers within the above frequency raster are mutually separated from each other by a predetermined number of carrier positions or virtual carriers greater than two, at least one such carrier position or virtual carrier being located between such peak value or data carrier and the edges of the frequency raster.

The symbol length or window of the AFC symbol may deviate from, e.g. may be smaller than, that of the data symbols. It will be clear, that the invention is not restricted to the above described examples and that it is very well possible to apply the invention e.g. without using a Hanning window or with another window signal processing, with only one data carrier per AFC symbol, and in case various data carriers are used with an irregular frequency spacing between the data carriers. It is furthermore possible to combine the AFC symbol with the zero symbol, to superpose it in a predertermined manner on one or more certain data symbol(s), or to use a yet undefined symbol as AFC symbol.

I claim:

1. System for broadcasting and receiving digital data within time divisional multiplexed channels, grouped in frames, each frame comprising multicarrier symbols, including data symbols and system symbols, each symbol comprising a set of orthogonal frequency division multiplexed carriers at carrier positions within a frequency raster with regular carrier spacing, said frames further including frequency reference symbols, each carrying information to generate a peak value at at least one reference peak position within the frequency raster, wherein the receiver comprises means for determining the ratio of leakage components occurring at both adjacent carrier positions of at least one reference peak position, and means for deriving an AFC signal from said ratio, which varies with said ratio, said AFC signal being supplied to frequency control means for reducing the difference between said ratio and unity.

2. System according to claim 1, wherein each symbol includes virtual carriers and/or data carriers at the carrier positions within the frequency raster, the virtual carriers having no signal power, wherein each of the frequency reference symbols comprises at each reference peak position a data carrier having a peak signal power level, each such data carrier being separated by at least one virtual carrier from each of the edges of the frequency raster and by at least two virtual carriers from the data carrier at an eventual subsequent reference peak position, in which receiver the said AFC signal varies with the power ratio of the carrier leakage components occurring at both adjacent carrier positions of a peak position.

3. System according to claim 2, wherein the receiver comprises a window signal processor for the received frequency reference symbol for emphasizing the power of the carrier leakage components increasingly in the direction of the reference peak position.

4. System according to claim 3, wherein the window signal processor comprises a Hanning window signal processor for the received frequency reference symbol.

5. Receiver for receiving digital data within time divisional multiplexed channels, grouped in frames, each frame comprising multicarrier symbols, including data symbols and system symbols, each symbol comprising a set of orthogonal frequency division multiplexed carriers at carrier positions within a frequency raster with regular carrier spacing, said frames further including frequency reference symbols, each carrying information to generate a peak value at at least one reference peak position within the frequency raster, said receiver comprising means for determining the ratio of leakage components occurring at both adjacent carrier positions of at least one reference peak position, and means for deriving an AFC signal from said ratio, which varies with said ratio, said AFC signal being supplied to frequency control means for reducing the difference between said ratio and unity.

6. Receiver according to claim 5, wherein each symbol includes virtual carriers and/or data carriers at the carrier positions within the frequency raster, the virtual carriers having no signal power, wherein each of the frequency reference symbols comprises at each reference peak position a data carrier having a peak signal power level, each such data carrier being separated by at least one virtual carrier from each of the edges of the frequency raster and by at least two virtual carriers from the data carrier at an eventual subsequent reference peak position, in which receiver the said AFC signal varies with the power ratio of the carrier leakage components occurring at both adjacent carrier positions of a peak position.

7. Receiver according to claim 6, further comprising a window signal processing of the received frequency reference symbol for emphasizing the power of the carrier leakage components increasingly in the direction of the reference peak position.

8. Receiver according to claim 7, further comprising a Hanning window signal processor for the received frequency reference symbol.

* * * * *